United States Patent
Dainez et al.

(10) Patent No.: US 9,759,211 B2
(45) Date of Patent: Sep. 12, 2017

(54) CONTROL METHOD FOR A RESONANT LINEAR COMPRESSOR AND AN ELECTRONIC CONTROL SYSTEM FOR A RESONANT LINEAR COMPRESSOR APPLIED TO A COOLING SYSTEM

(75) Inventors: Paulo Sérgio Dainez, Joinville SC (BR); Dietmar Erich Bernhard Lilie, Joinville SC (BR); Márcio Roberto Thiessen, Joinville SC (BR)

(73) Assignee: Whirlpool S.A. (BR)

(*) Notice: Subject to any disclaimer, the term of this patent is extended or adjusted under 35 U.S.C. 154(b) by 745 days.

(21) Appl. No.: 13/810,099

(22) PCT Filed: Jul. 14, 2011

(86) PCT No.: PCT/BR2011/000223
§ 371 (c)(1),
(2), (4) Date: May 31, 2013

(87) PCT Pub. No.: WO2012/006701
PCT Pub. Date: Jan. 19, 2012

(65) Prior Publication Data
US 2013/0243607 A1    Sep. 19, 2013

(30) Foreign Application Priority Data
Jul. 14, 2010 (BR) .................................. 1013472

(51) Int. Cl.
*F04B 49/00* (2006.01)
*F04B 35/04* (2006.01)
(Continued)

(52) U.S. Cl.
CPC ............ *F04B 49/00* (2013.01); *F04B 35/045* (2013.01); *F04B 49/065* (2013.01);
(Continued)

(58) Field of Classification Search
CPC ...... F04B 2201/0201; F04B 2201/0206; F04B 2203/0401; F04B 2203/0402;
(Continued)

(56) References Cited

U.S. PATENT DOCUMENTS

| | | |
|---|---|---|
| 4,642,547 A | 2/1987 | Redlich |
| 5,342,176 A | 8/1994 | Redlich |

(Continued)

FOREIGN PATENT DOCUMENTS

| | | |
|---|---|---|
| EP | 0 909 896 | 4/1999 |
| GB | 2 352 533 | 1/2001 |

(Continued)

OTHER PUBLICATIONS

International Search Report dated Oct. 31, 2011 for International application No. PCT/BR2011/000223.
(Continued)

*Primary Examiner* — Dominick L Plakkoottam
(74) *Attorney, Agent, or Firm* — Fay Sharpe LLP

(57) ABSTRACT

A control method and system for a resonant linear compressor applied for controlling the capacity of a cooling system. The method includes: a) reading a reference operation power ($P_{ref}$) of the motor of the compressor; b) measuring an operation current ($i_{MED}$); c) measuring an operation voltage of a control module of the compressor; d) calculating an input power ($P_{MED}$) of the motor as a function of the operation current ($i_{MED}$) and of the operation voltage; e) comparing the input power ($P_{MED}$) with the reference operation power ($P_{ref}$); f) if the reference operation power ($P_{ref}$) is higher than the input power ($P_{MED}$), then increase an operation voltage of the compressor (UC); g) if the reference operation power ($P_{ref}$) is lower than the input power ($P_{MED}$), then decrease the operation voltage of the compressor (UC).

4 Claims, 5 Drawing Sheets

(51) Int. Cl.
*F04B 49/06* (2006.01)
*F25B 31/02* (2006.01)
*H02P 25/032* (2016.01)

(52) U.S. Cl.
CPC .......... *F25B 31/023* (2013.01); *H02P 25/032* (2016.02); *F04B 2201/0201* (2013.01); *F04B 2201/0206* (2013.01); *F04B 2203/0401* (2013.01); *F04B 2203/0402* (2013.01); *F04B 2203/0408* (2013.01); *F25B 2600/024* (2013.01)

(58) Field of Classification Search
CPC ............... F04B 2203/0408; F04B 35/045; F04B 49/00; F04B 49/065; F04B 2201/0202; F04B 2203/0404; F25B 31/023; F25B 2400/073; F25B 2600/021; F25B 2600/2507; F25B 49/025; H02P 25/027; F25D 11/022; F25D 2700/122; F25D 2700/123
See application file for complete search history.

(56) References Cited

U.S. PATENT DOCUMENTS

| | | | |
|---|---|---|---|
| 5,496,153 | A | 3/1996 | Redlich |
| 5,897,296 | A | 4/1999 | Yamamoto et al. |
| 6,176,683 | B1 | 1/2001 | Yang |
| 6,203,292 | B1 | 3/2001 | Morita et al. |
| 6,354,805 | B1 | 3/2002 | Moller |
| 7,439,692 | B2* | 10/2008 | Lee .............. F04B 35/045 318/119 |
| 8,277,199 | B2* | 10/2012 | Yoo .............. F04B 49/065 417/44.11 |
| 2001/0005320 | A1* | 6/2001 | Ueda .............. F04B 35/045 363/95 |
| 2003/0108430 | A1* | 6/2003 | Yoshida .............. F04B 35/045 417/44.11 |
| 2004/0108824 | A1 | 6/2004 | Ueda et al. |
| 2005/0137722 | A1 | 6/2005 | Yoo et al. |
| 2007/0095073 | A1 | 5/2007 | Tian et al. |
| 2010/0179693 | A1* | 7/2010 | Sung .............. F25B 49/025 700/275 |
| 2011/0103973 | A1* | 5/2011 | Dainez .............. F04B 35/045 417/44.1 |

FOREIGN PATENT DOCUMENTS

| | | |
|---|---|---|
| JP | 11-336661 | 12/1999 |
| KR | 96 15062 | 10/1999 |
| KR | 96 79125 | 1/2000 |
| WO | WO 01/71186 | 9/2001 |
| WO | WO 2004/025120 | 3/2004 |

OTHER PUBLICATIONS

Written Opinion of the International Searching Authority dated Oct. 31, 2011 for International application No. PCT/BR2011/000223.
Written Opinion of the International Preliminary Examining Authority dated Jul. 26, 2012 for International application No. PCT/BR2011/000223.
International Preliminary Report dated Oct. 23, 2012 for International application No. PCT/BR2011/000223.

\* cited by examiner

CONTROL METHOD FOR A RESONANT LINEAR COMPRESSOR AND AN ELECTRONIC CONTROL SYSTEM FOR A RESONANT LINEAR COMPRESSOR APPLIED TO A COOLING SYSTEM

The present invention relates to a control method and system for a resonant linear compressor, this equipment being applied to a cooling system for controlling its capacity.

The proposed solution makes use of an optimized control, essentially supported on the inlet power of the compressor in comparison with the reference power supplied and/or calculated for said equipment.

DESCRIPTION OF THE PRIOR ART

Alternating piston compressors generate pressure by compressing gas inside a cylinder, through the axial movement of its piston, so that the gas on the low-pressure side (suction or evaporation pressure) will go into the cylinder through the suction valve.

Said gas, in turn, is compressed inside the cylinder through the piston movement and, after compression, it comes out of the cylinder through the discharge valve into the high-pressure side (discharge or condensation pressure).

For resonant linear compressors, the piston is actuated by a linear actuator, which is formed by a support and magnets that can be actuated by one or more coils, one or more springs that connect the moveable part (piston, support and magnets) to the fixed part (cylinder, stator, coil, head and frame). The moveable parts and the springs form the resonant assembly of the compressor.

Then, the resonant assembly actuated by the linear motor has the function of developing the linear alternative movement, causing the piston movement inside the cylinder to exert a compression action for compressing the gas admitted through the suction valve, as far as the point where it can be discharged through the discharge valve into the high-pressure side.

The operation amplitude of the linear compressor is regulated by the balance of the power generated by the motor and the power consumed by the mechanism in compressing the gas. In this way, there is no limit defined for maximum amplitude of piston displacement, and it is necessary to measure or estimate the maximum displacement, so that the control system can actuate the compressor in safety and prevent mechanical impact of the piston against the stroke end. This impact might generate loss of efficiency, acoustic noise and breakdown of the compressor.

Another important characteristic of resonant linear compressors is their actuation frequency, since such a piece of equipment is designed for functioning at the resonance frequency of the so-called mass/spring system of the assembly. In this condition, the efficiency of the equipment is maximum, the total mass being equal to the sum of the mass of the moveable part (piston, support and magnets), and the so-called equivalent spring is equal to the sum of the resonant spring of the system plus the gas spring generated by the gas compression force.

Said gas compression force has a behavior similar to that of a variable and non-linear spring, which depends on the evaporation and condensation pressures of the cooling system, and also on the gas used in the system.

When the system operates at the resonance frequency, the motor current is in quadrature with the displacement, or the motor current is in phase with the counter electromotive force of the motor, since the latter is proportional to that derived from the displacement.

Since the actuation frequency is adjusted to the resonance frequency, it is known that, in order to vary the cooling capacity, it is necessary to vary the amplitude of the piston displacement, thus varying the gas volume displaces per cycle and the cooling capacity of the compressor.

Most solutions available at present in the prior art for controlling capacity combine solutions of measuring or estimating the stroke with a system of controlling the maximum displacement, adjusting this displacement for modifying the cooling capacity.

Thus, a solution proposed for obtaining the compressor stroke is the use of position sensors, such as the solutions described in documents PI0001404-4, PI0203724-6, U.S. Pat. No. 5,897,296, JP 1336661 and U.S. Pat. No. 5,897,269.

It should be pointed out that all the solutions with position sensor for measuring the stroke have greater complexity, a more elevated stroke, besides needing a larger number of wires and external connections to the compressor. Since the cooling compressors are hermetical and may be subject to high temperatures and pressures, then the need for extra connections is a great difficulty, besides the fact that the inner environment of the compressor is also subject to a wide temperature variation, which makes the use of sensors difficult as well. Additionally, there may be need for a process of calibrating said sensors during production or during the functioning thereof.

Other solutions do not use position sensors, like those of U.S. Pat. No. 5,342,176, U.S. Pat. No. 5,496,153, U.S. Pat. No. 4,642,547. Documents U.S. Pat. No. 6,176,683, KR 96-79125 and KR 96-15062, similar to the three solutions mentioned before, do not employ position sensors on their objects either.

Thus, it should be pointed out that the solutions without position sensors have good accurateness or operation stability and, in general, need other types of sensors, such as temperature sensors or accelerometer for detecting impact. Moreover, the construction of the compressor may also need a mechanical solution that makes the compressor more resistant to mechanical impact, which generally impairs the performance of the compressor or bring additional costs.

In the face of the foregoing, one proposes the present invention with a view to provide a control method and system for a resonant compressor, which are capable of providing more efficient and more optimized control for the equipment in controlling the capacity of a cooling system.

OBJECTIVES OF THE INVENTION

A first objective of the present invention is to provide a control method for a resonant linear compressor, capable of providing control of equipment capacity.

A second objective of the present invention is to provide an electronic control system for a linear compressor, especially applied to a cooling system, the latter being capable of eliminating the need for sensors or of complex methods for estimating the piston stroke, for wide ranges of displacement amplitude.

A further objective of the present invention is to provide a control method and system for reducing the final cost of the compressor.

Additionally, an objective of the present invention is to reduce the noise peaks of the compressor and to improve its operation stability.

Finally, another objective of the present invention is to implement a simple solution in comparison with the solutions of the prior art, for large-scale production of said control.

BRIEF DESCRIPTION OF THE INVENTION

A way to achieve the objectives of the present invention is by providing a control method for the resonant linear compressor, applied to a cooling system, so that such method comprises the following steps:

a) Reading a reference operation power of the compressor;

b) Measuring an operation current of the compressor motor;

c) Measuring an operation voltage of a control module of the compressor;

d) Calculating an inlet power of the compressor motor as a function of the operation current measured in step b) and of the operation voltage obtained in step c);

e) Comparing the input power calculated in the preceding step with the reference operation power;

f) If the reference operation power is higher than the input power, then increase the operation voltage of the compressor;

g) If the reference operation power is lower than the input power, then increase the operation voltage of the compressor.

A second way to achieve the objectives of the present invention is by providing an electronic control system for a resonant linear compressor employed to a cooling system, the resonant linear compressor comprising an electric motor and a displacement piston, the electric motor of the compressor being actuated from an operation voltage of the compressor, the system comprising an electronic processing device configured for measuring an operation current of the electric motor of the compressor, the processing device being configured to provide an input power of the compressor as a function of the operation current of the motor measured, and to compare this input power with a reference operation power value, the system being configured to increase or decrease the operation voltage of the compressor from a difference in power calculated between the input power and the reference operation power.

BRIEF DESCRIPTION OF THE DRAWINGS

The present invention will now be described in greater detail with reference to the attached drawings, in which.

DETAILED DESCRIPTION OF THE FIGURES

As mentioned before, most solutions employed for controlling capacity combines the known measuring techniques, or stroke estimation, with a system of controlling maximum piston displacement, adjusting this displacement to act at the cooling capacity of the system.

Additionally, such techniques take into account, in many cases, the use of position sensors, in order to measure the piston stroke, thus causing a considerable increase in cost for the final product.

On the other hand, the solutions without position sensor do not have good accuracy or operation stability, and sometimes it is necessary to use additional devices, such as temperature sensors and accelerometers for impact detection. This construction implies a piece of equipment of higher cost and longer maintenance time.

Figure 1:
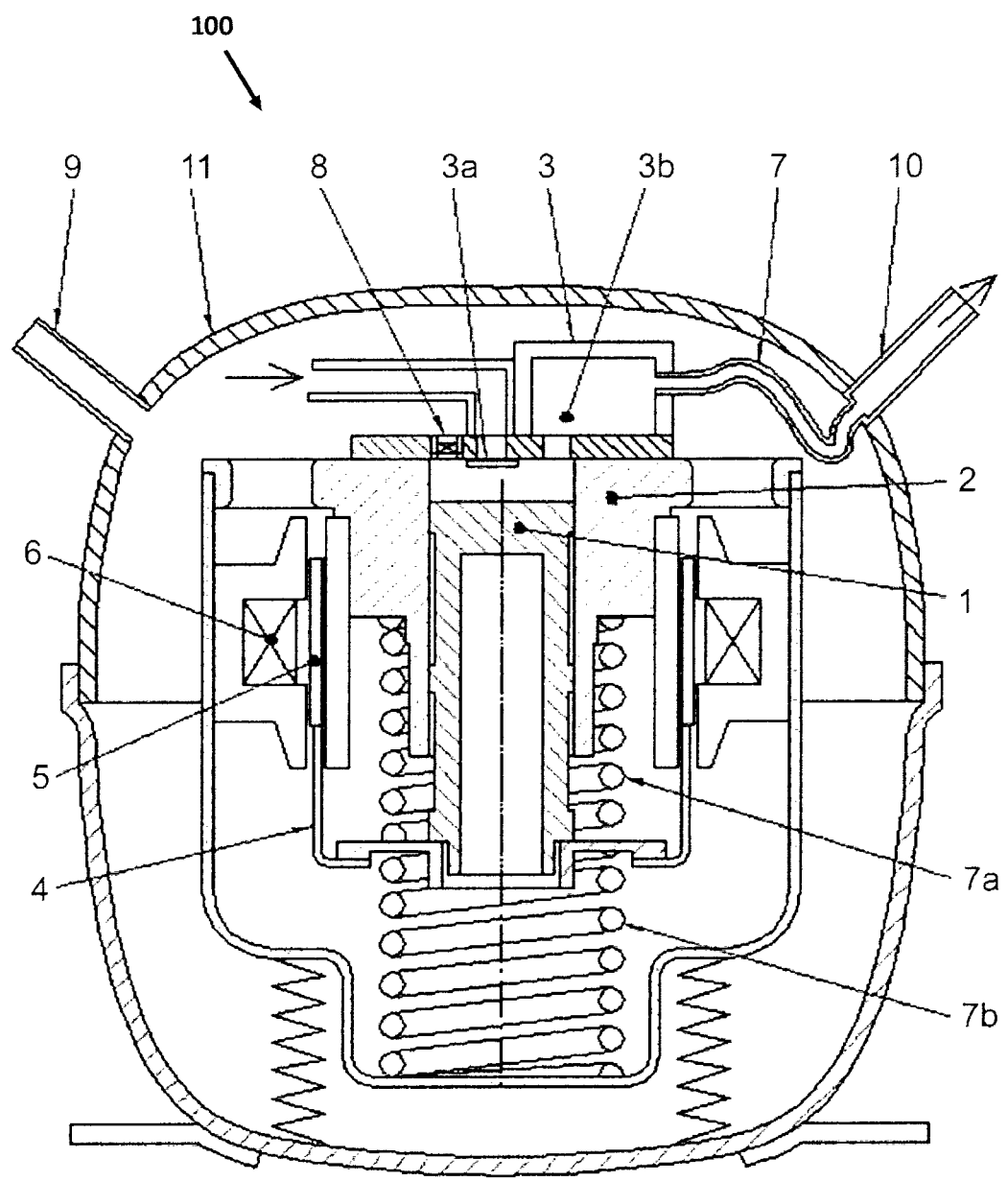
FIG. 1 is a schematic view of a resonant linear compressor.

The present invention employs innovatory method and system for controlling a resonant linear compressor 100, such a compressor being illustrated in FIG. 1. Said control method is preferably applied to a cooling system, being intended to operate according to the following steps:

a) reading a reference operation power $P_{ref}$ of the compressor 100;

b) measuring an operation current $i_{MED}$ of the compressor 100 motor;

c) measuring an operation voltage of a control module of the compressor 100;

d) calculating an input power $P_{MED}$ of the compressor 100 motor as a function of the operation current $i_{MED}$ measured in step b) and of the operation voltage obtained in step c);

e) comparing the input power $P_{MED}$ calculated in the preceding step with the reference operation power $P_{ref}$;

f) if the reference operation power $P_{ref}$ is higher than the input power $P_{MED}$, then increase an operation voltage of the compressor UC;

g) if the reference operation power $P_{ref}$ is lower than the input power $P_{MED}$, then decrease the operation voltage of the compressor UC.

Figure 2:
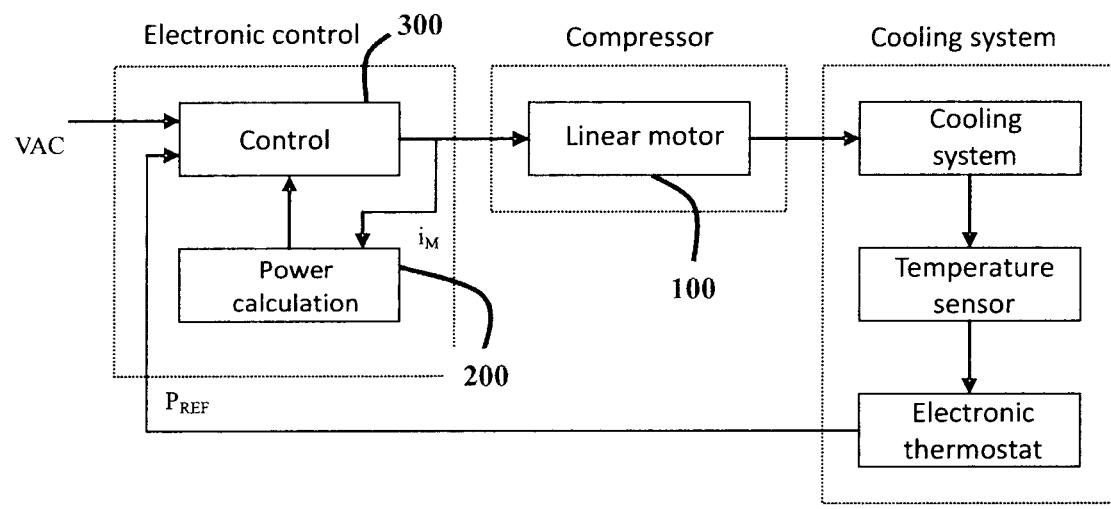
FIG. 2 shows a block diagram of the control of the cooling system of the present invention.

Said reference operation power $P_{ref}$ is read or presented to the present system via operator or user of the final equipment. Otherwise, the operation power $P_{ref}$ is calculated as a function of a signal from the electronic thermostat of the cooling system, as shown in FIG. 2.

The same figure shows a block diagram of control of the cooling system, pointing out its main blocks, or operational steps, necessary to the correct functioning of the presently proposed object.

Figure 3:
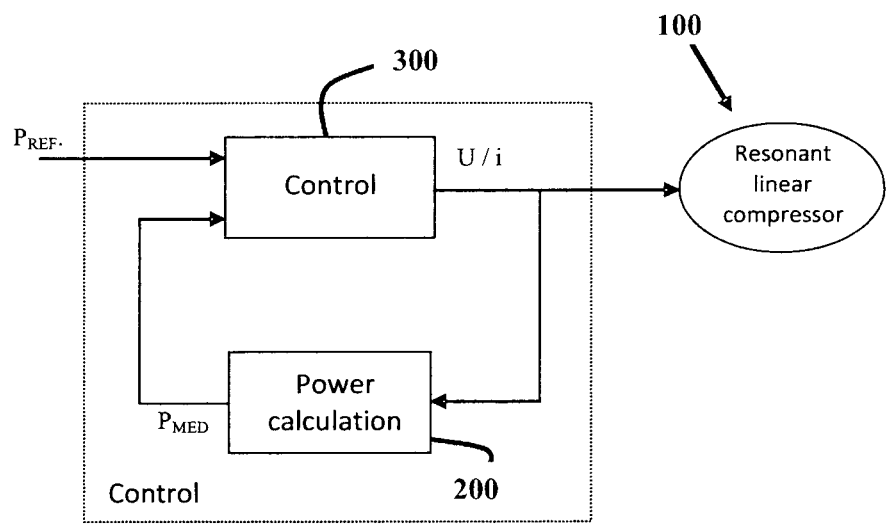
FIG. 3 shows a simplified block diagram of the electronic control of the present invention.

FIG. 3, in turn, shows a more simplified block diagram, pointing out the essential steps of the claimed system.

It should be pointed out that the present control method further comprises, in an alternative manner, the following steps:

h) detecting a piston displacement value $D_{pis}$ of the compressor 100;

i) comparing the piston displacement $D_{pis}$ with a maximum displacement value $D_{Pmax}$;

j) checking whether the piston displacement value $D_{pis}$ is higher than the maximum displacement value $D_{Pmax}$, and, if not, carrying out the sequence of preceding steps "d", "e" and "f"; and k) checking whether the piston displacement value $D_{pis}$ is lower than the maximum displacement value $D_{Pmax}$, and, if not, then decrease the operation voltage of the compressor UC.

Figure 6:
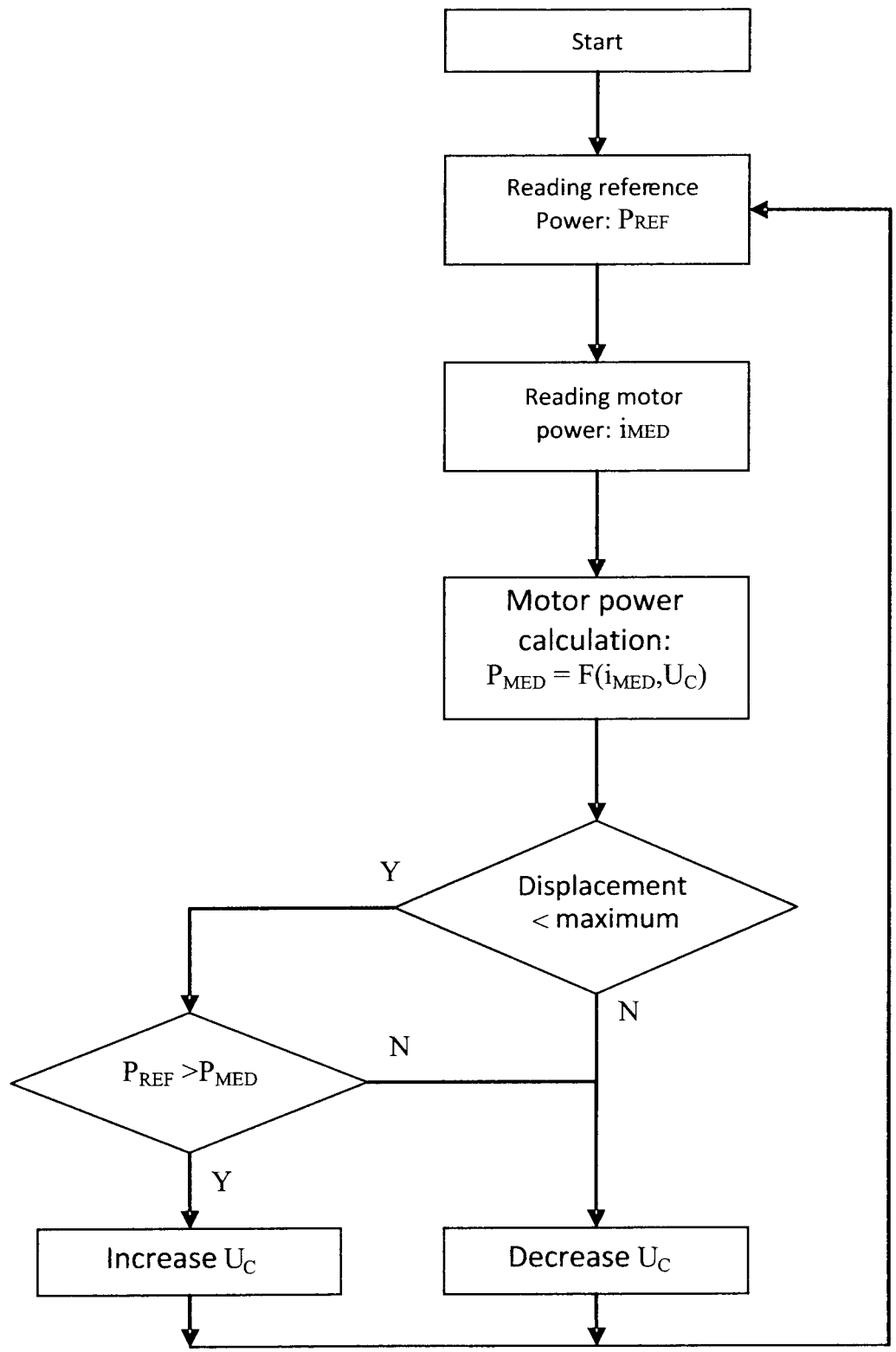
FIG. 6 shows a flow chart of the control system of the present invention.

FIG. 6 shows, by means of a flow chart, the main steps involved in the proposed control method.

Steps "j" and "k" are employed so as to foresee a system for protecting or detecting the piston-stroke limit, thus preventing impact of the piston with its stroke end. For the present application, it is important to evaluate whether the stroke has reached the maximum limit for protection of the system or not, rather than necessarily intermediate displacement values.

In the scope of the present invention, one further foresees measuring the operation current $i_{MED}$ of the compressor 100 and calculating the input power $P_{MED}$ through a processing electronic device 200.

Said electronic device 200, in conjunction with a control module, or electronic power device 300, operates the electric motor of the resonant linear compressor 100 within the teachings of the present invention.

Figure 4:
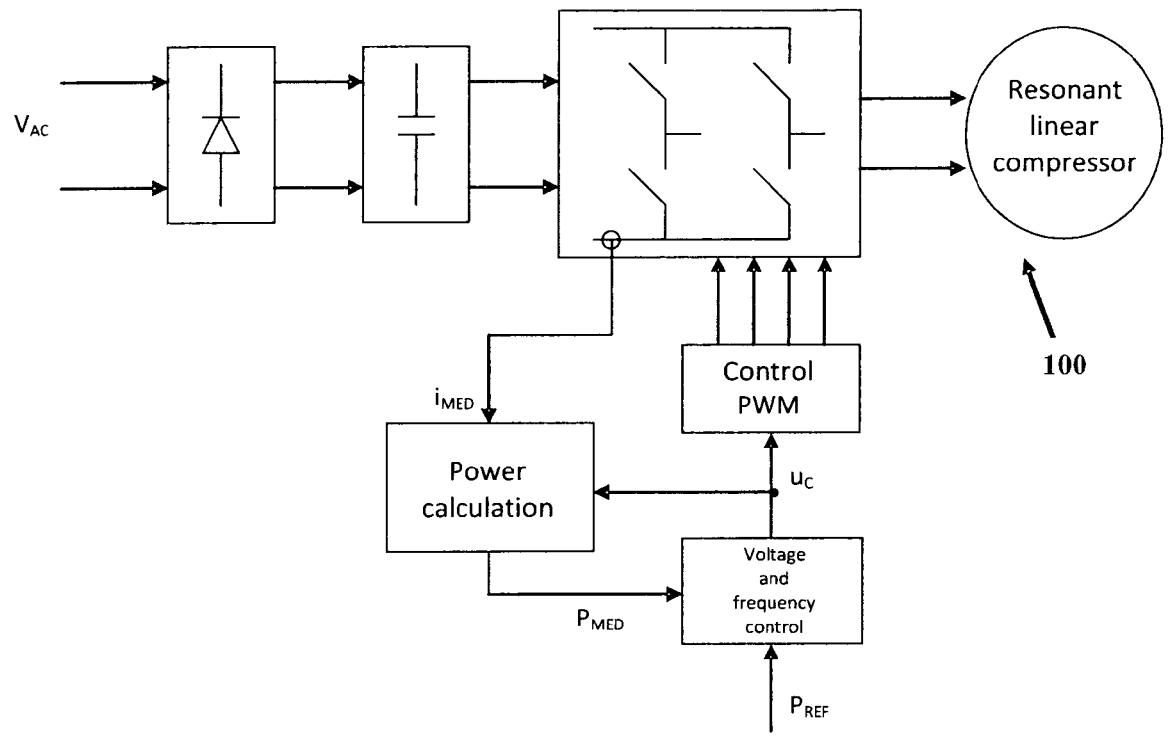
FIG. 4 shows block diagram of the control with actuation by inverter, according to the teachings of the present invention.
Figure 5:
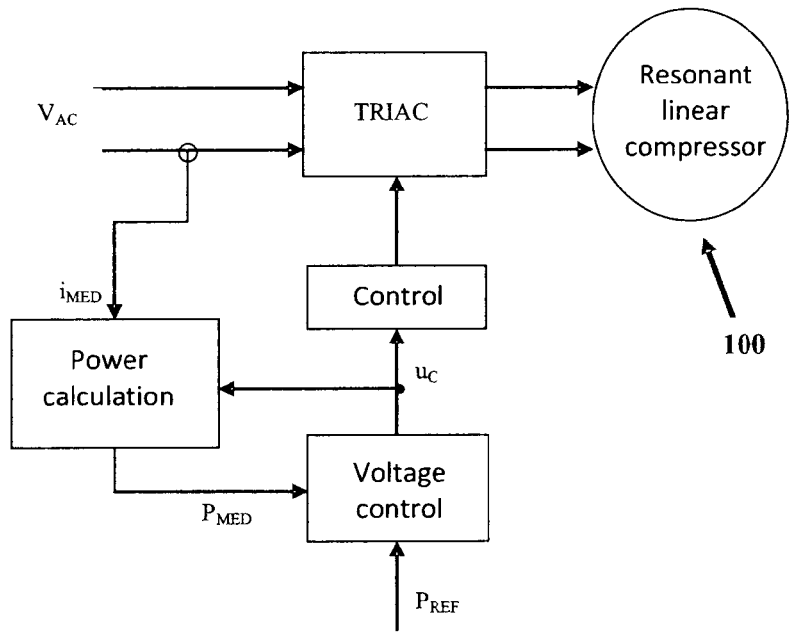
FIG. 5 shows a block diagram of the control with actuation by TRIAC-type device.

More particularly, the operation voltage of the compressor UC is increased or decreased from the electronic power device 300, the latter being of the inverter or TRIAC type. FIGS. 4 and 5 shows the two possible embodiments for the power step for the present method.

Figure 7:
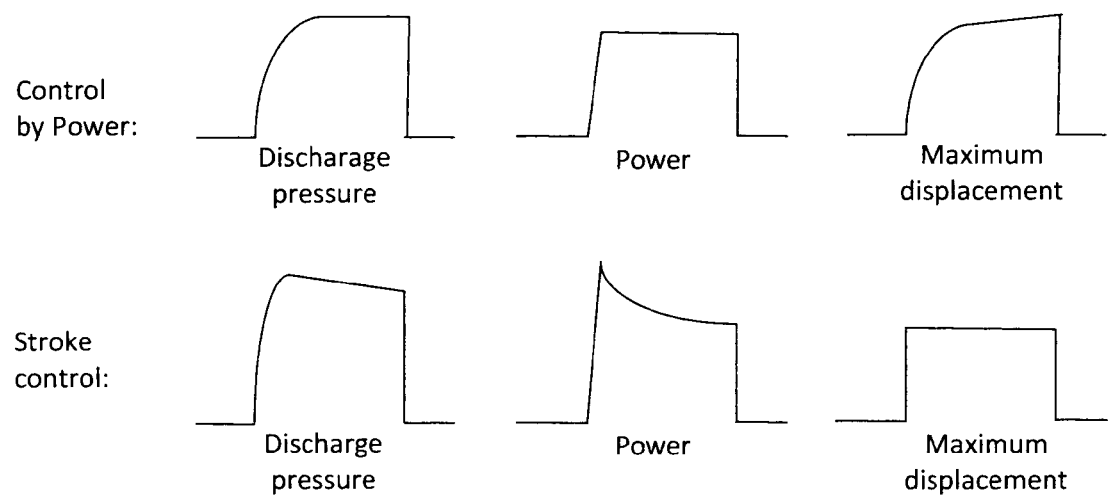
FIG. 7 shows the wave forms of the discharge pressure, identifying the power and the maximum piston displacement for control by power versus control by stroke, according to the present invention.

FIG. 7, in turn, shows a flow chart of the whole control method, embracing the essential steps for capacity control of a cooling system.

The presently claimed object further foresees an electronic control system for the resonant linear compressor 100, especially applied to a cooling system.

Said system take into account the fact that the resonant linear compressor 100 comprises an electric motor and a displacement piston, so that the electric motor of the compressor 100 will be actuated from an operation voltage of the compressor UC.

In a more broad manner, the proposed system operates according to the steps of the method already described before.

It should be pointed out that said system comprises a processing electronic device 200, configured for measuring an operation current of the electric motor of the compressor 100.

On the other hand, the processing device 200 is configured for providing an input power $P_{MED}$ of the compressor 100 as a function of motor operation current measured, and comparing this input power $P_{MED}$ with a reference operation power $P_{ref}$ value.

In line with the method developed, the present system is configured for increasing or decreasing the operation voltage of the compressor UC from a power difference $D_{ifpot}$ calculated between the input power $P_{MED}$ and the reference operation power $P_{ref}$.

The operation voltage of the compressor UC is increased or decreased from a electronic power device 300 of the inverter or TRIAC type, as shown in FIGS. 4 and 5.

Preferably, the processing electronic device 200 is configured for digital control of the whole system.

Once again, it should be pointed out that the adjustment of the operation voltage of the compressor UC is given from the comparison of the reference operation power $P_{ref}$ with the input power $P_{MED}$.

In greater detail, it should be pointed out that the operation voltage of the compressor UC is increased when a reference operation voltage value $P_{ref}$ is higher than the input power $P_{MED}$. Similarly, the operation voltage of the compressor UC is decreased in the condition that a reference operation power $P_{ref}$ value is lower than the input power $P_{MED}$.

Still more preferably, the operation voltage of the compressor UC is increased or decreased from a pulse width modulation control PWM. However, other types of control signal may be employed without detriment to the functioning of the whole system, according to the teachings of the present invention.

In the face of the foregoing, the presently claimed object achieves the objectives by means of a control method and system for a resonant linear compressor, capable of eliminating the need for sensors or complex methods for estimating the piston stroke for wide ranges displacement amplitude.

Additionally, it should be pointed out that the present invention, besides reducing the cost of the compressor as compared with presently available solutions, further enables one to reduce possible noise peaks of the compressor, as well as improving the operation stability thereof. Such stability is achieved the same power is kept constant for the same reference.

Finally, it should be further mentioned that the pressure peaks during the starting of the compressor are reduced, according to the teachings of the present invention, while the power is kept constant, unlike the stroke-control technique that was usually employed before, which generates a consumption peak and an "overshot" in the discharge pressure, as shown in FIG. 7. It should be mentioned that, in order to further reduce pressure peaks, which may contribute to generating high noises during the start, it is possible to introduce a ramp for the power, according to the teachings of the present invention, further limiting the "overshot" in the pressure.

A preferred embodiment example having been described, one should understand that the scope of the present invention embraces other possible variations, being limited only by the contents of the accompanying claims, which include the possible equivalents.

The invention claimed is:

1. A control method for a resonant linear compressor (100), applied to a cooling system, the method comprising:
  reading a reference operation power ($P_{ref}$) of the compressor (100), wherein said step of reading the reference operation power ($P_{ref}$) comprises one of: (i) reading input from a user that indicates said reference operation power ($P_{ref}$); (ii) reading a temperature signal from a thermostat that indicates a temperature of the cooling system and calculating the reference operation power ($P_{ref}$) as a function of the temperature signal;
  measuring an operation current ($i_{MED}$) of the motor of the compressor (100);
  measuring an operation voltage of a control module of the compressor (100);
  calculating an input power ($P_{MED}$) of the motor of the compressor (100) as a function of the operation current ($i_{MED}$) and of the operation voltage;
  detecting a piston displacement value ($D_{pis}$) of the compressor (100);
  comparing the piston displacement value ($D_{pis}$) with a maximum displacement value ($D_{Pmax}$);
  if the piston displacement value ($D_{pis}$) is higher than the maximum displacement value ($D_{Pmax}$), then decrease the operation voltage of the compressor (UC) using an electronic power device (300);
  if the piston displacement value ($D_{pis}$) is lower than the maximum displacement value ($D_{Pmax}$), then carrying out a sequence of steps comprising:
    comparing the input power ($P_{MED}$) with the reference operation power ($P_{ref}$);

if the reference operation power ($P_{ref}$) is higher than the input power ($P_{MED}$), then increase an operation voltage of the compressor (UC) using the electronic power device (300);

if the reference operation power ($P_{ref}$) is lower than the input power ($P_{MED}$), then decrease the operation voltage of the compressor (UC) using the electronic power device (300).

2. The control method according to claim 1, wherein the measurement of operation current ($i_{MED}$) of the compressor motor (100) and the calculation of the input power ($P_{MED}$) are carried out on a processing electronic device (200).

3. The control method according to claim 1, wherein the electronic power device (300) used to increase and decrease the operation voltage (UC) of the compressor comprises one of the inverter and a TRIAC.

4. An electronic control system for a resonant linear compressor (100), applied to a cooling system, the resonant linear compressor (100) comprising an electric motor and a displacement piston, the system comprising a processing electronic device (200) configured for input of a reference operation power ($P_{ref}$) and an operation current ($i_{MED}$) of the electric motor of the compressor (100), wherein said electronic device (200) is configured for input of said reference operation power ($P_{ref}$) by one of: (i) reading user input that indicates said reference operation power ($P_{ref}$); (ii) reading a temperature signal from a thermostat that indicates a temperature of the cooling system and calculating the reference operation power ($P_{ref}$) as a function of the temperature signal, the processing electronic device (200) being configured for measuring an operation voltage of the compressor (100) and providing an input power ($P_{MED}$) of the compressor (100) as a function of the measured operation voltage and operation current ($i_{MED}$) of the motor, the processing electronic device (200) being further configured for comparing the input power ($P_{MED}$) with the reference operation power ($P_{ref}$) and, the processing electronic device (200) being further configured for comparing a piston displacement value ($D_{pis}$) with a maximum displacement value ($D_{Pmax}$) such that:

if the piston displacement value ($D_{pis}$) is higher than the maximum displacement value ($D_{Pmax}$), then decrease the operation voltage of the compressor (UC), otherwise if the piston displacement value ($D_{pis}$) is lower than the maximum displacement value ($D_{Pmax}$), then:

comparing the input power ($P_{MED}$) with the reference operation power ($P_{ref}$);

increasing the operation voltage of the compressor (UC) if the reference operation power ($P_{ref}$) is higher than the input power ($P_{MED}$); and decreasing the operation voltage of the compressor (UC) if the reference operation power ($P_{ref}$) is lower than the input power ($P_{MED}$).

* * * * *